United States Patent
Padmanabh et al.

(10) Patent No.: US 8,659,865 B2
(45) Date of Patent: Feb. 25, 2014

(54) SYSTEM AND METHOD FOR PROTECTION OF ELECTRICAL APPLIANCES

(75) Inventors: Kumar Padmanabh, Uttar Pradesh (IN); Sai Pawan Kumar Chevuru, Maharashtra (IN); Sanjoy Paul, Karnataka (IN)

(73) Assignee: Infosys Limited, Karnataka (IN)

( * ) Notice: Subject to any disclaimer, the term of this patent is extended or adjusted under 35 U.S.C. 154(b) by 135 days.

(21) Appl. No.: 13/073,090

(22) Filed: Mar. 28, 2011

(65) Prior Publication Data

US 2012/0212872 A1 Aug. 23, 2012

(30) Foreign Application Priority Data

Feb. 17, 2011 (IN) .............................. 451/CHE/2011

(51) Int. Cl.
*H02H 3/08* (2006.01)
*H02H 3/00* (2006.01)
*H02H 9/08* (2006.01)
*H02H 7/00* (2006.01)
*H02H 9/00* (2006.01)

(52) U.S. Cl.
USPC .................. 361/93.6; 361/2; 361/18; 361/42

(58) Field of Classification Search
USPC ........................................ 361/2, 18, 42, 93.6
See application file for complete search history.

(56) References Cited

U.S. PATENT DOCUMENTS

| | | | |
|---|---|---|---|
| 4,367,510 A * | 1/1983 | Watanabe | 361/160 |
| 5,057,962 A * | 10/1991 | Alley et al. | 361/24 |
| 6,940,272 B2 | 9/2005 | Niv | |
| 7,161,782 B2 | 1/2007 | Juntunen et al. | |
| 7,233,866 B2 * | 6/2007 | Iaquinangelo | 702/64 |
| 7,480,542 B2 * | 1/2009 | Kroeger et al. | 700/202 |
| 7,795,759 B2 | 9/2010 | Dubose et al. | |
| 2010/0109619 A1 | 5/2010 | Tsou et al. | |

* cited by examiner

*Primary Examiner* — Jared Fureman
*Assistant Examiner* — Lucy Thomas
(74) *Attorney, Agent, or Firm* — Michael Best & Friedrich LLP

(57) ABSTRACT

An electrical circuit for protecting an electrical load from overload current is provided. The system includes a voltage transformer configured to receive AC mains voltage from an electric mains supply and further configured to apply reduced voltage to the electrical load. A control switch comprising metal contacts is connected to the voltage transformer. The control switch is configured to facilitate application of reduced value of AC mains voltage to the electrical load. A reduced value of current flowing through the electrical load is measured by a current transformer connected in series with the electrical load. The reduced value of current is then used for estimating a current consumption value in event of AC mains voltage being directly applied to the electrical load. A control signal is then used for disconnecting the electrical circuit if the estimated current consumption value is greater than threshold overload current value.

15 Claims, 3 Drawing Sheets

SYSTEM AND METHOD FOR PROTECTION OF ELECTRICAL APPLIANCES

FIELD OF INVENTION

The present invention relates generally to the field of software control of electrical appliances. More particularly, the present invention is directed towards using a software fuse for protecting electrical appliances from overload current.

BACKGROUND OF THE INVENTION

With electrical appliances becoming ubiquitous in recent years, safety of appliances is of paramount concern to manufacturers and users of the appliances. A widespread use of electrical appliances can be seen in day-to-day life in residential as well as business establishments. Electrical appliances generally operate on A.C mains supply delivered through electrical installations in residential as well as commercial establishments. Typically, electricity directing devices are mounted as electrical installations in industrial and residential environments comprising slots or holes that receive electricity through distribution lines and direct the electricity to one or more appliances that operate using electricity. Examples of electricity directing devices include, but are not limited to, wall sockets, power outlets, power points, extension cables, or power strips etc.

Safety and health regulations in most of the countries necessitate the use of safety fuses for protecting electrical appliances connected to electricity directing devices. A safety fuse is an electrical device that interrupts flow of current through an electrical appliance or an electric current by detecting passage of overload current through the appliance and disconnecting power supply from the rest of the circuit. Overload current is defined as current value greater than which an appliance or an electric circuit is designed to pass through safely. Classically, an overload current to burn a safety fuse is 2 to 5 times the magnitude of a circuit's normal operating current value. If the overload current in an electric circuit is not detected and the circuit is not disconnected, it may damage other elements of the device or may melt power supply wires.

Characteristically, a safety fuse consists of a metal wire or an alloy wire element arranged in series with the appliance or electric circuit and is designed to carry current passing through the appliance. The safety fuse is a sacrificial element specifically constructed with a rated current value so that if normal current flows through it, the appliance works normally. However, if a current value more than melting integral value ($I^2t$) is passed through the fuse for a specific time, the fuse element melts down. Melting integral value of a fuse indicates a thermal value required to melt a specific fuse element. For a particular fuse element, construction, materials and cross sectional area of the fuse element determines the melting integral value of the fuse. The fuse element is usually made up of a material such as zinc, copper, silver, aluminum or other alloys. Melting of the fuse element breaks down the circuit and avoids damage to elements of the circuit.

Since contemporary safety fuses allow passing of overload current through the load for a specific time before melting out, in some cases, the time may be sufficient for the electrical load to be damaged or an electrical hazard to occur. Moreover, since the fuse is a sacrificial element, a user has to replace the fuse once it melts in order to be able to use the load again. Also, since each load has a different overload current value, a distinct safety fuse is required to be used for a distinct load.

In light of the limitations associated with using a safety fuse, there is a need to have an advanced method and system for protecting electric appliances and circuits so that any damage to the appliances due to overload current is avoided.

SUMMARY OF THE INVENTION

An electrical circuit for protecting an electrical load from overload current is provided. In an embodiment of the present invention, the overload current may arise in the electrical circuit due to electric short circuit. In another embodiment of the present invention, the overload current may arise in the electrical circuit due to a current surge. In yet another embodiment of the present invention, the overload current may arise in the electrical circuit due to circuit malfunction.

In various embodiments of the present invention, the electrical circuit includes a voltage transformer configured to receive AC mains voltage from an electric mains supply and further configured to apply reduced voltage to the electrical load. The reduced voltage is obtained using a pre-determined value of transformation ratio of the voltage transformer. A control switch comprising metal contacts is connected to the voltage transformer. The control switch is configured to facilitate application of reduced value of AC mains voltage to the electrical load, wherein the reduced voltage is applied to the electrical load for a pre-specified duration of time. A current transformer connected in series with the electrical load is configured to measure a reduced value of current flowing through the electrical load.

In an embodiment of the present invention, a microcontroller operationally connected to the current transformer and the control switch is configured to employ the reduced value of current coming from secondary of the step-down transformer for estimating a current consumption value in event of AC mains voltage being directly applied to the electrical load. The microcontroller is further configured to send an activating signal to a load switch for switching OFF the electrical load from the electrical circuit if the estimated current consumption value is greater than threshold overload current value corresponding to the electrical load.

In an embodiment of the present invention, the microcontroller is connected to a computing device through a computer network. The computing device is being accessed by an application user. The microcontroller is configured to communicate information to the computing device informing the user of possible damage to the electrical load if the electrical load is directly connected to the electric mains supply. In various embodiments of the present invention, the computer network may be one of a Local Area Network, a Wide Area Network, a Metropolitan Area Network or a Personal Area Network.

In an embodiment of the present invention, the microcontroller receives one or more threshold overload current values from a server in the computer network. The one or more threshold overload current values are set by the application user. The microcontroller is configured to store one or more threshold overload current values corresponding to one or more electrical loads. The microcontroller stores the threshold overload current values directly or using other computing devices on the computer network.

In various embodiments of the present invention, the system comprises a mechanical switch provided for detecting presence of electrical load when the electrical load is connected within the electrical circuit. The microcontroller sends control signal for actuating metal contacts in the control switch upon detecting presence of electrical load wherein the metal contacts are actuated for connecting the electrical load to electric mains supply through the voltage transformer so that a reduced voltage is applied to the electrical load.

In an embodiment of the present invention, the microcontroller computes the current consumption value using the measured reduced value of current and turns ratio of the voltage transformer. If the estimated current consumption value is less than the threshold overload current value, the microcontroller compares the estimated current consumption value with the threshold overload current value and sends a control signal to actuate metal contacts of the control switch in order to connect the electrical load directly to the electric mains supply.

In an embodiment of the present invention, a method for protecting an electrical load from overload current includes applying a reduced value of AC voltage to an electrical load through a voltage transformer, wherein the AC voltage is received from an electric mains supply. Further, the method includes measuring reduced value of current through the electrical load. An estimated current consumption value is compared with a threshold overload current value, where the estimated current consumption value is associated with current flowing through the electrical load if the electrical load is directly connected to the electric mains supply. The electrical load is switched off if the estimated current consumption value is greater than the threshold overload current value. However, if the estimated current consumption value is less than the threshold overload current value, the electrical load is directly connected to the electric mains supply.

In various embodiments of the present invention, threshold overload current values corresponding to various electrical loads are received from a server in the computer network. The threshold overload current values are configured by a network user and stored in the server of the computer network. In an embodiment of the present invention, the threshold overload current values are received from the server and are used by the microcontroller for comparison with estimated current consumption values.

In an embodiment of the present invention, a network user is informed about possible damage to the electrical load, if the estimated current consumption value is greater than the threshold overload current value.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

Figure 1:
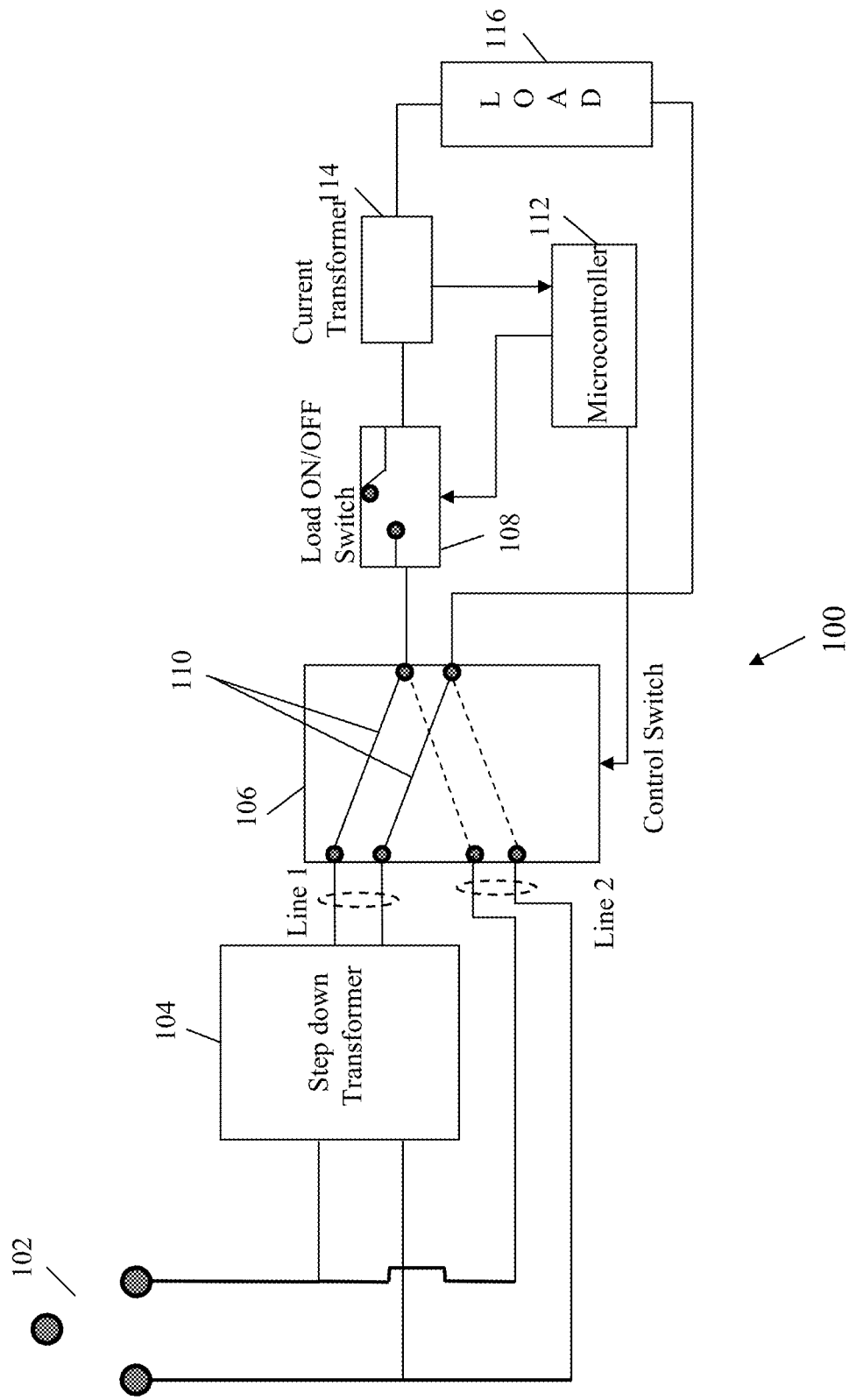
FIG. 1 is a schematic diagram of a system depicting circuit elements of the invention operating in conjunction with each other for protecting electrical appliances or circuits.

FIG. 1 is a schematic diagram of system 100 depicting circuit elements of the invention operating in conjunction with each other for protecting electrical appliances or circuits. The system and method of the present invention utilizes an approach of stepping down A.C. mains voltage using a transformer and applying the stepped-down voltage through secondary winding of a transformer to an electrical load instead of directly applying A.C. mains voltage to the load. A corresponding value of reduced current flowing through the load is then measured. Based on the reduced current value, a proportional value of "actual current" that would flow when the A.C. mains voltage would be directly applied to the electrical load is calculated based on the parameters of the transformer. The calculated proportional current value is then compared with a threshold overload current value corresponding to the load. In the event of the estimated current value being greater than the threshold overload current value, the electrical load remains isolated from the A.C. mains by means of a relay device. Thus, the electrical load is protected from damage due to overload current.

As illustrated in the figure, voltage from an A.C. mains supply 102 is applied to a transformer 104. Transformer 104 is a standard voltage transformer configured to step down A.C. mains voltage using a pre-specified turns ratio. Turns ratio of a transformer is defined as ratio of number of turns of secondary winding to number of turns of primary winding. Typically, the voltage ratio of a transformer is directly related to the turns ratio of the transformer by the following equation:

$$\frac{V_s}{V_p} = \frac{N_s}{N_p} \quad (1)$$

where $V_s$=secondary voltage, $V_p$=primary voltage, $N_s$=Number of turns in the secondary winding and $N_p$=Number of turns in the primary winding.

Turns ratio of a transformer defines the transformer as a step-up or a step-down transformer. For a step-down transformer, the number of turns in the secondary winding is less than that in the primary winding, and vice versa.

Transformer 104 is configured to apply a reduced voltage to Load 116 through a two-way Control Switch 106. Control Switch 106 is a relay device which is operated to control the application of supply voltage to Load 116 in such a manner that Load 116 is protected from damage due to overload current. A relay is an electromechanical switch comprising contacts which are actuated in order to build or interrupt connections between electrical devices connected to the relay. Control Switch 106 comprises metal contacts 110 which are actuated in order to connect A.C. mains supply 102 to Load 116 either directly or through Transformer 104. Metal contacts 110 may be constructed using metals such as aluminum, copper, metal alloy, magnetic reed etc. In an exemplary embodiment of the present invention, actuation of metal contacts 110 is performed using a solenoid in Control Switch 106 which is energized by a control signal. A primary system element used for driving Control Switch 106 through a control signal is a Microcontroller 112. Microcontroller 112 is a standard processing device which is configured to generate control signal for activating metal contacts 110 of Control Switch 106. As described further, Microcontroller 112 generates the control signal based on comparison of estimated current consumption value through Load 116 with a threshold overload current value.

In an embodiment of the present invention, when Load 116 is connected in the system 100, Microcontroller 112 detects presence of Load through a mechanical switch (not shown in the figure). Initially when an electrical device or appliance (represented by Load 116) is plugged into sockets provided with the system 100, the socket pins displace a mechanical switch attached to Microcontroller 112. Within a few seconds of being connected in the system 100, the presence of Load 116 is detected. Microcontroller 112 then actuates metal contacts 110 of the two-way Control Switch 106, such that the Control Switch 106 is in low current mode. Control Switch 106 remains in the low current mode unless it is activated to swing the other way. Upon actuation of metal contacts, a stepped-down voltage is applied to Load 116 through secondary winding of Transformer 110 for a specific amount of time. The amount of time for which the stepped-down voltage is applied is a configurable parameter based on the type of Load 116 (type of electrical appliance). In an embodiment of the present invention, time value of application of stepped-down voltage is configured and stored within memory of Microcontroller 112. Thus, based on the type of Load 116, a reduced current flows through it for a specific amount of time.

As shown in the figure, Load ON/OFF switch 108 and Current Transformer 114 are connected in series with Load 116. Thus, the reduced current flowing from secondary winding of Transformer 104 through Load 116 also flows through the aforementioned elements. Using Current Transformer 114, Microcontroller 112 then measures the current value across Load 116. The measured current value is multiplied with turns ratio of Transformer 104 for estimating a current consumption value of Load 116, in the case where AC mains supply 102 would have been directly connected to Load 116. Since turns ratio associated with Transformer 104 is a known value, the stepped-down voltage value applied to Load 116 is also a known value which is then used to estimate the current consumption value. In an embodiment of the present invention, instead of Current Transformer 114, a current sensor or a low resistance system is used in conjunction with Microcontroller 112 for measuring current value flowing through Load 116.

Microcontroller 112 then compares the estimated current consumption value with an overload current value corresponding to Load 116. In an embodiment of the present invention, Microcontroller 112 stores overload current value corresponding to Load 116. Based on comparison of the pre-stored overload current value with the estimated current consumption value, Microcontroller 112 sends an activating signal to Load ON/OFF switch 108 for switching the Load 116 ON or OFF. In an embodiment of the present invention, if the estimated current consumption value is less than the pre-stored threshold overload current value, Microcontroller 112 sends an activating signal to Load ON/OFF switch 108 for switching ON the Load 116. Further, Microcontroller 112 also sends a control signal to the two-way Control Switch 106 so that the actuating contacts 110 are swung and Load 116 is directly connected to AC mains supply 102 allowing a high value of current to flow.

However, in another embodiment of the present invention, if the estimated current consumption value is greater than the pre-stored overload current value, Microcontroller 112 does not send a control signal to Control Switch 106. Thus, the metal contacts 110 are not actuated and Load 116 is not directly connected to AC mains supply 102. Microcontroller 112 sends a signal to Load ON/OFF switch 108 for switching OFF the Load 116. Further, Microcontroller 112 sends an information message to an application user informing the user of possible damage to Load 116, if it is directly connected to A.C. mains supply 102. In an exemplary embodiment of the present invention, the user is configured to access a computing device connected to the Microcontroller 112 through a computer network.

Thus, since reduced current is applied through secondary winding of Transformer 104 for determining whether overload current flows through Load 116, isolation is provided between AC mains supply 102 and Load 116. Thus, in various embodiments of the present invention, AC mains supply stays protected in the case of overload current which may arise in the circuit due to various factors such as short circuit, any kind of current surge or any circuit malfunction.

In another embodiment of the present invention, for protecting an electrical socket from damage due to overload current, system 100 can be used in conjunction with an electrical socket. Threshold overload current value of the electrical socket may be set by a user connected to system 100 through a computer network. In yet another embodiment of the present invention, multiple instances of system 100 can be used within an infrastructure facility having multiple power points for protecting the power points from damage due to faulty loads. Examples of an infrastructure facility may include, but is not limited to, an organization, a building, a residential colony, a business establishment, a hospital etc. In yet another embodiment of the present invention, one or more circuit instances of system 100 can be embedded within an electric switchboard for protecting devices connected to the switchboard.

Figure 2:
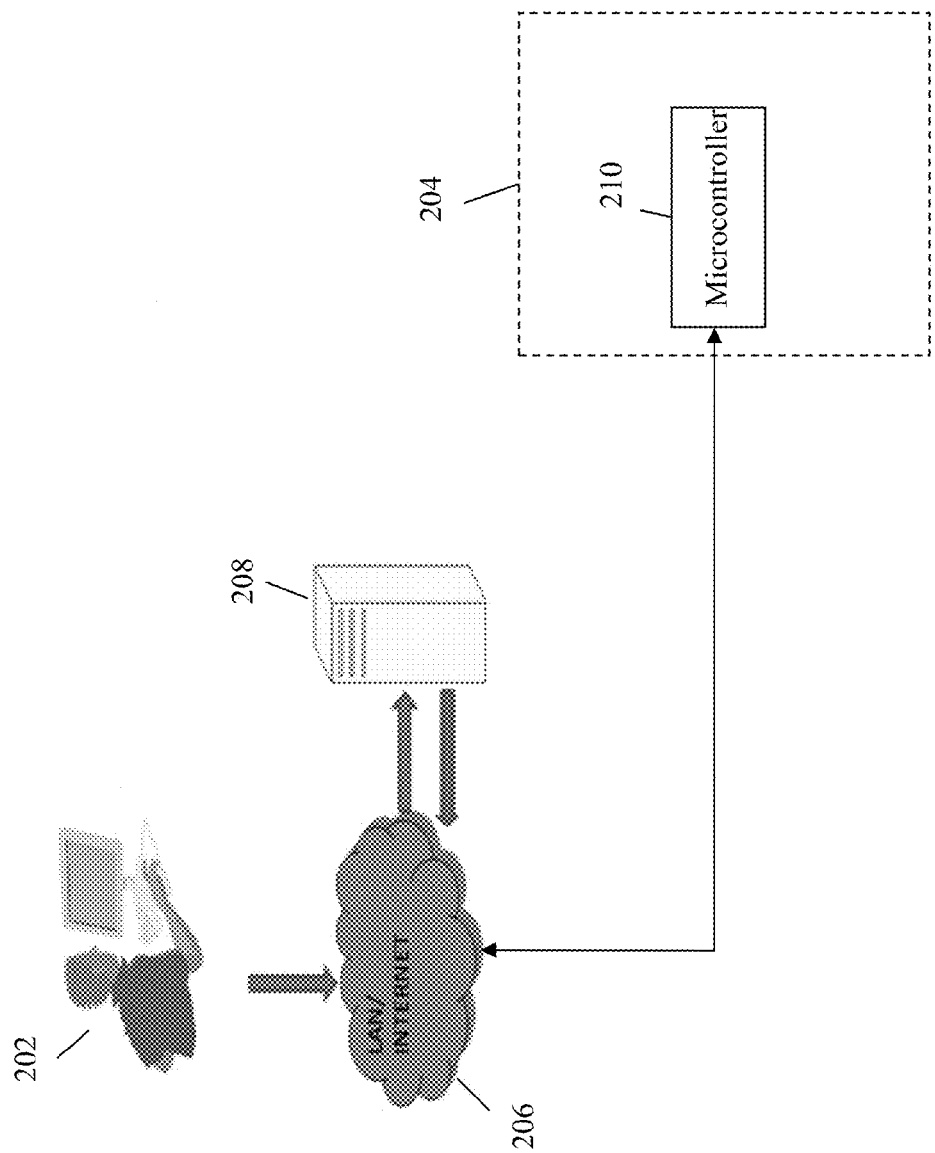
FIG. 2 is a schematic diagram illustrating software control of the system of the invention by a user connected through a computer network for protecting electrical loads.

FIG. 2 is a schematic diagram illustrating software control of the system of the invention by a user connected to the system through a computer network for protecting electrical loads. A critical aspect of the present invention includes setting of threshold overload current values corresponding to various electrical loads within the system of the invention (illustrated in FIG. 1) for protecting diverse electrical loads as well as AC mains supply from damage due to overload current. In an embodiment of the present invention, Microcontroller 112 (illustrated in FIG. 1) stores individual threshold overload current values corresponding to distinct electric appliances used with the system of the invention.

As shown in the figure, a user 202 is connected to Microcontroller 210 of the system of the invention 204 which has various communication channels available through a computer network 206. As described with respect to FIG. 1, System 204 is an electrical appliance protection system which may be used in conjunction with an electrical socket for protecting electrical appliances connected to the socket. In an exemplary embodiment of the present invention, computer network 206 may be a Local Area Network (LAN), a Wide Area Network (WAN), a Metropolitan Area Network (MAN), a Personal Area Network (PAN) etc. A server 208 is operationally connected to the network 206 which is configured to service users, such as user 202. User 202 can access the network 206 through a computing device in order to transmit data to system of the invention 204.

In an embodiment of the present invention, user 202 logs into the network 206 and sets one or more threshold overload current values corresponding to various electrical loads (appliances) which are then stored in the server 208. User 202 may set threshold overload current values using a web application running on the server 208. Server 208 transmits threshold overload current values corresponding to various loads to Microcontroller 210. In an embodiment of the present invention, after receiving the threshold overload current values, a memory in Microcontroller 210 stores the overload current values. Based on the type of electrical load (appliance) used in conjunction with the system of the invention 204, a stored overload current value corresponding to the electrical load is extracted from memory and is used for switching the load ON/OFF.

During operation of the system of the invention 204 as described with reference to FIG. 1, if it is determined by Microcontroller 210 that reduced current flowing through an electrical load is greater than threshold overload current value associated with the load, it sends an information message through the network 206 which can be accessed by user 202.

Figure 3:
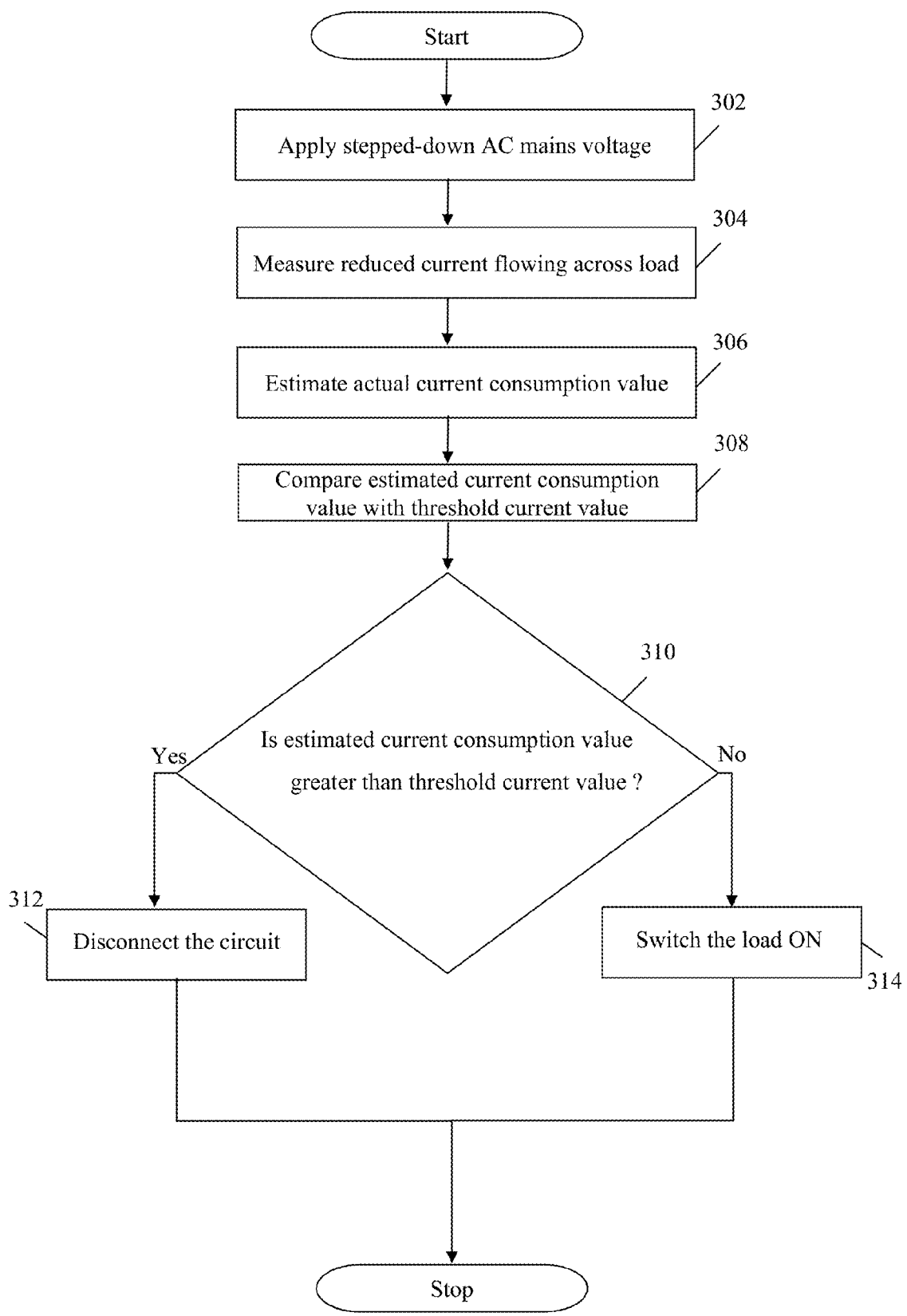
FIG. 3 is a flowchart illustrating method steps for controlling switching of an electrical load within a circuit in order to protect the electrical load from damage, in accordance with an embodiment of the present invention.

FIG. 3 is a flowchart illustrating method steps for controlling switching of an electrical load within a circuit in order to protect the electrical load from damage, in accordance with an embodiment of the present invention. At step 302, a stepped-down AC mains voltage is applied to a load through a transformer. The stepped-down AC mains voltage is a known value which is applied to the load in order to cause a reduced value of current flowing through the load. At step 304, the reduced value of current is measured using a current transformer. Once, the reduced current value is measured, at step 306 an estimated current consumption value is calculated, where the estimated current consumption value is the value of current consumed by the load if the AC mains voltage would have been directly applied to the load. After calculating estimated current consumption value, at step 308, the estimated value is compared with a pre-stored threshold overload current value corresponding to the electrical load. At step 310, if it is determined that the estimated current consumption value is greater than the threshold overload current value for the load, it may be that the load is faulty and includes faulty wiring or a design fault. In such a case, connecting the defective load in the circuit may result in damage to AC mains supply and/or the load due to excess current flow. Hence, at step 312, a signal is sent to a Load ON/OFF switch for switching the load connection OFF and the circuit is disconnected. Further, an information message is also sent to a user providing notification regarding the defective load. However, if it is determined that the estimated current consumption value is less than the threshold overload current value for the load, at step 314, a control switch is triggered for connecting the load directly across AC mains supply.

Thus, the present invention enables predetermination of load characteristic of an electrical load before connecting it to AC mains supply. Various embodiments of the present invention can be implemented using a combination of hardware and software. The system of the present invention can be implemented by physically incorporating the system and/or method into hardware system such as an electrical system of an electrical device. The system of the present invention may be implemented fully using standard logic circuits and VLSI design elements or may be implemented using a combination of logic circuits and mechanical elements/devices. One or more hardware components of system of the invention may be realized in the form of mechanical elements including, but not limited to, solid-state relays, electromagnetic switches, voltage transformers, solenoids, and the like. Further, the method steps of the invention may be implemented using software that can be stored on a storage medium, and executed on a programmed general purpose computer with the cooperation of a controller and memory. The software may be realized using general-purpose programming language.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. An electrical circuit for protecting different types of electrical loads from overload current, the electrical circuit comprising:
   a voltage transformer configured to receive AC mains voltage from an electric mains supply and apply a reduced voltage value of the AC mains voltage to an electrical load for a pre-specified duration of time, wherein the pre-specified duration of time is determined based on a type of the electrical load connected to the electrical circuit, the pre-specified duration of time being stored at a microcontroller within the electrical circuit, and further wherein the reduced voltage is obtained using a pre-determined value of transformation ratio of the voltage transformer;
   a control switch comprising metal contacts, the control switch being connected to the voltage transformer, wherein the control switch is configured to facilitate application of the reduced voltage to the electrical load, wherein the reduced voltage is applied to the electrical load for the pre-specified duration of time;
   a current transformer connected in series with the electrical load and configured to measure a reduced value of current flowing through the electrical load during the pre-specified duration of time, wherein the reduced value of current flowing through the electrical load corresponds to the reduced voltage; and
   the microcontroller operationally connected to the current transformer and the control switch, wherein the microcontroller is configured to employ the measured reduced value of current for estimating, during the pre-specified duration of time, a current consumption value, the current consumption value being a value of current consumed by the electrical load in an event of AC mains voltage being directly applied to the electrical load, further wherein the microcontroller is configured to send an activating signal to a load switch for switching OFF the electrical load from the electrical circuit if the estimated current consumption value is greater than threshold overload current value corresponding to the electrical load type.

2. The electrical circuit of claim 1, wherein the microcontroller is connected to a computing device through a computer network, further wherein the computing device is accessed by an application user and the microcontroller is configured to communicate information to the computing device informing the user of possible damage to the electrical load if the electrical load is directly connected to the electric mains supply.

3. The electrical circuit of claim 2, wherein the microcontroller is further configured to store one or more threshold overload current values corresponding to one or more electrical loads types.

4. The electrical circuit of claim 3, wherein the microcontroller receives the one or more threshold overload current values from a server in the computer network, further wherein the one or more threshold overload current values are set by the application user.

5. The electrical circuit of claim 4, wherein the computer network is at least one of a Local Area Network, a Wide Area Network, a Metropolitan Area Network and a Personal Area Network.

6. The electrical circuit of claim 1, wherein the microcontroller is further configured to detect presence of electrical load when the electrical load is connected within the electrical circuit, wherein the microcontroller sends control signal for actuating metal contacts in the control switch upon detecting presence of electrical load, the metal contacts being actuated for connecting the electrical load to electric mains supply through the voltage transformer so that a reduced voltage is applied to the electrical load.

7. The electrical circuit of claim 1, wherein the microcontroller computes the current consumption value using the measured reduced value of current and turns ratio of the voltage transformer.

8. The electrical circuit of claim 1, wherein the microcontroller compares the estimated current consumption value with the threshold overload current value and sends a control signal to actuate metal contacts of the control switch in order to connect the electrical load directly to the electric mains supply, if the estimated current consumption value is less than the threshold overload current value.

9. The electrical circuit of claim 1, wherein the overload current may arise in the electrical circuit due to electric short circuit.

10. The electrical circuit of claim 1, wherein the overload current may arise in the electrical circuit due to a current surge.

11. The electrical circuit of claim 1, wherein the overload current may arise in the electrical circuit due to circuit malfunction.

12. A method for protecting different types of electrical loads in an electrical circuit from overload current, the method comprising:

applying a reduced voltage value of AC voltage to an electrical load for a pre-specified duration of time through a voltage transformer, wherein the AC voltage is received from an electric mains supply, and further wherein the pre-specified duration of time is determined based on a type of the electrical load connected in the electrical circuit;

measuring reduced value of current flowing through the electrical load during the pre-specified duration of time, wherein the reduced value of current flowing through the electrical load corresponds to the reduced voltage;

estimating, during the pre-specified duration of time, a current consumption value based on the measured reduced value of current, wherein the current consumption value is a value of current consumed by the electrical load in an event of AC voltage being directly applied to the electrical load;

comparing the estimated current consumption value with a threshold overload current value corresponding to the electrical load type;

switching off the electrical load if the estimated current consumption value is greater than the threshold overload current value; and directly connecting the electrical load to the electric mains supply, if the estimated current consumption value is less than the threshold overload current value.

13. The method of claim 12 further comprising communicating with a computer network for informing a user connected to the network about possible damage to the electrical load, if the estimated current consumption value is greater than the threshold overload current value.

14. The method of claim 12 further comprising receiving the threshold overload current value corresponding to the electrical load from a server in the computer network.

15. The method of claim 14 further comprising configuring the threshold overload current value by the user, wherein the threshold value is stored in the server of the computer network.

* * * * *